United States Patent
Marti et al.

(10) Patent No.: US 9,638,989 B2
(45) Date of Patent: May 2, 2017

(54) DETERMINING MOTION OF PROJECTION DEVICE

(71) Applicant: QUALCOMM Incorporated, San Diego, CA (US)

(72) Inventors: Stefan J. Marti, Oakland, CA (US); Eric Liu, Redwood City, CA (US); Seung Wook Kim, Cupertino, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 81 days.

(21) Appl. No.: 14/690,290

(22) Filed: Apr. 17, 2015

(65) Prior Publication Data

US 2015/0323860 A1 Nov. 12, 2015

Related U.S. Application Data

(63) Continuation of application No. 13/246,424, filed on Sep. 27, 2011, now Pat. No. 9,033,516.

(51) Int. Cl.
| | |
|---|---|
| *H04N 5/232* | (2006.01) |
| *G03B 21/14* | (2006.01) |
| *H04N 9/31* | (2006.01) |

(52) U.S. Cl.
CPC .......... *G03B 21/147* (2013.01); *H04N 9/3185* (2013.01); *H04N 9/3194* (2013.01)

(58) Field of Classification Search
CPC .................................. G03B 21/28; G06K 9/36
USPC ...... 353/69, 46, 70, 101, 122; 348/745–747, 348/806; 382/103, 276
See application file for complete search history.

(56) References Cited

U.S. PATENT DOCUMENTS

| | | | |
|---|---|---|---|
| 7,213,926 B2 | 5/2007 | May et al. | |
| 7,284,866 B2 | 10/2007 | Buchmann | |
| 7,486,274 B2 | 2/2009 | Forlines et al. | |
| 7,857,460 B2 | 12/2010 | Klosowiak et al. | |
| 7,978,928 B2 | 7/2011 | Tan et al. | |
| 8,189,957 B2 | 5/2012 | Tan et al. | |
| 8,786,682 B2* | 7/2014 | Shpunt | G01B 11/2518 348/50 |
| 8,919,965 B2* | 12/2014 | Bowen | G03B 21/147 353/101 |
| 2006/0285089 A1* | 12/2006 | Higashi | G03B 21/53 353/101 |
| 2007/0112444 A1* | 5/2007 | Alberth, Jr. | G01C 21/365 700/32 |

(Continued)

FOREIGN PATENT DOCUMENTS

KR 20100129437 A 12/2010

OTHER PUBLICATIONS

Raskar, R. et al., "iLamps: Geometrically Aware and Self-configuring Projectors", Appears in ACM SIGGRAPH 2003 Conference Proceedings, 2003, pp. 1-10.

(Continued)

*Primary Examiner* — Seung C Sohn
(74) *Attorney, Agent, or Firm* — Kilpatrick Townsend & Stockton LLP

(57) ABSTRACT

Example embodiments disclosed herein relate to determining a motion based on projected image information. Image information is projected onto an external surface from a device. Sensor information about the external surface and/or projection is received. Motion of the device is determined based on the sensor information.

23 Claims, 4 Drawing Sheets

(56) References Cited

U.S. PATENT DOCUMENTS

2007/0282564 A1* 12/2007 Sprague ................ G03B 21/14
                                                  702/141
2011/0148789 A1   6/2011 Kim et al.
2012/0223885 A1*  9/2012 Perez .................... G06F 3/011
                                                  345/158
2013/0077059 A1   3/2013 Marti et al.

OTHER PUBLICATIONS

Willis, Karl D.D., et al: Motionbearn: Designing for Movarnant with Handheld Projectors; http:llivanpoupyrev.cornie-library12.010lchi2010-rnotion-beam.pdf > on pp. 3253-3258; Apr. 15, 2010.

* cited by examiner

DETERMINING MOTION OF PROJECTION DEVICE

CROSS-REFERENCES TO RELATED APPLICATIONS

This application is a Continuation of U.S. non-provisional application Ser. No. 13/246,424, filed on Sep. 27, 2011, entitled "DETERMINING MOTION OF PROJECTION DEVICE," all of the foregoing applications of which are incorporated herein by reference in their entireties for all purposes.

BACKGROUND

Service providers and manufacturers are challenged to deliver quality and value to consumers, for example by providing projection capabilities in mobile devices. For example, cellular phones may include such projection capabilities. Mobile projectors can be difficult to implement because projections would need to be corrected to compensate for movement.

BRIEF DESCRIPTION OF THE DRAWINGS

The following detailed description references the drawings, wherein.

DETAILED DESCRIPTION OF THE INVENTION

Figure 1B:
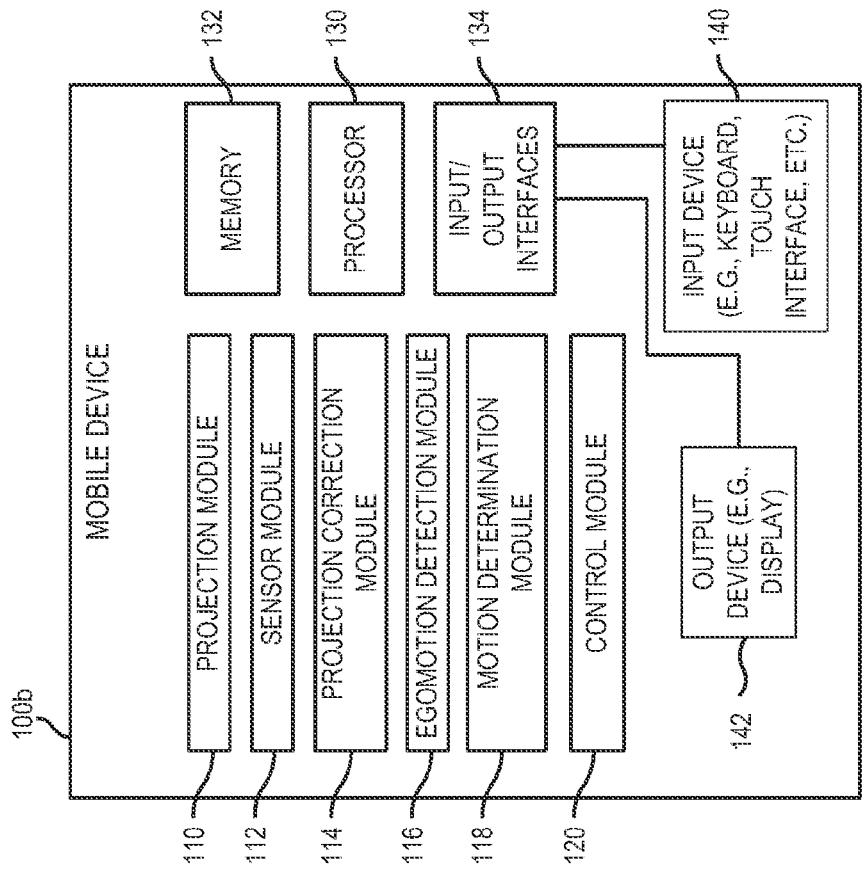
FIGS. 1A and 1B are block diagrams of mobile devices capable of determining whether a movement of the respective devices is associated with a movement pattern, according to various examples.

As noted above, handheld projectors apply the use of image projection to mobile devices. Mobile devices such as mobile phones, personal digital assistants, digital cameras, tablets, etc. can be used to project image information to an external surface. To compensate for mobility, the devices can use one or more projection correction mechanisms to estimate the motion of the respective devices. For example, if the mobile device is tilted from its original position, the correction mechanism can keep the projection situated as if the mobile device has not been tilted.

A purpose of a projection correction mechanism is to normalize and/or stabilize a projected image from the mobile device onto a nearby object or surface. For example, if a user holds the mobile device and projects to a nearby wall, the projection can remain at the same location of the wall even if the user moves the mobile device. In addition, the normalization can include correction of the projection with regards to projection angle and other user motions, such as unintentional shaking and/or intentional user movements. Correction can be accomplished using various methods such as by shifting the projection, using keystone correction, combinations thereof, or the like.

In one example, keystone effects can be determined by a processor of the mobile device. The keystone effect is caused by attempting to project an image to a surface at an angle. The image looks to be projected as a trapezoid and/or tombstone. To correct this effect, the projector can display an image that, when displayed on the surface, can correct the keystone effect, for example, by intentionally distorting the image projected to compensate.

The information used for projection correction can also be used to estimate the motion of the mobile device in a three dimensional (30) space. In certain embodiments, egomotion is the 30 motion of a device with at least one sensor (e.g., an image sensor, a distance sensor, combinations thereof, etc.) within an environment relative to a rigid scene. In one example, the sensor is an image sensor such as a camera and the egomotion is determined by processing a sequence of images taken by the camera. This egomotion information can be used to determine the movement of the mobile device.

Further, movements of the mobile device can be monitored based on the egomotion data. The movements can be determined to be unintentional or intentional. Intentional movements can correspond to one or more patterns such as gesture patterns. For example, a movement of the mobile device tilting the mobile device up and/or down rotationally can correspond to a first pattern. Multiple different motions of the mobile device can correspond to the first pattern. For example, varying degrees of rotational movement can correspond to the first pattern. Examples of patterns include a rotational vertical movement via a horizontal axis, a rotational horizontal movement via a vertical axis, a movement towards the surface, a movement away from the surface, other predetermined movements of the mobile device, custom patterns, etc. While the pattern is being completed in the movement, the projection can be corrected. In this manner, the correction system can be used to both determine gestures and correct image projection.

Gesture detection processes can be implemented to analyze the egomotion data or other spatial data in order to distinguish between unintentional movements (e.g., jittering) and intentional device movements (e.g., a command gesture to scroll a view of the projection, a command gesture to zoom in on the projection, etc.).

Figure 1A:
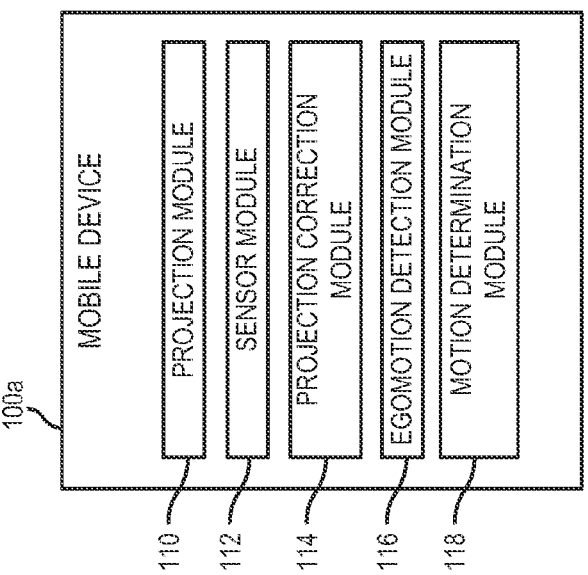

Referring now to the drawings, FIGS. 1A and 1B are block diagrams of mobile devices capable of determining whether a movement of the respective devices is associated with a movement pattern, according to various examples. Mobile devices 100a, 100b include components that can be utilized to determine an intentional movement of the respective mobile device 100 based on an analysis of a projection caused by the respective mobile device 100. The respective mobile devices 100a, 100b may be a cellular phone, a tablet computing device, a camera, or any other mobile computing device with projection capabilities.

The mobile device 100 can include a projection module 110 that can be used to project image information onto an external surface. In certain embodiments, image information includes static images and/or moving images. For example, image information can include pictures, video, multiple frames of images, or other media. Further, in certain embodiments, an external surface is an outer part of an object, for example, a wall, a projection screen, etc. The projection module 110 can be natively attached to the mobile device 100 or be included as a peripheral device. Moreover, the projection module 110 can include components for focusing and/or altering the image information before projecting the image information onto the external surface. In certain examples, the projection module 110 can create an image on the external surface by shining light through a small transparent image, by using lasers, or the like. Examples of projection technology include video projector technology, slide projector technology, laser technology, Light Emitting Diode (LED) technology, etc. The size of the projection module 110 can be made for a mobile device, for example by using pico projection technology or nano projection technology.

A sensor module 112 can be used to receive sensor information based on the projected image information, the external surface, or a combination thereof. In various examples, the sensor module 112 includes an image sensor (e.g., a camera, an optical sensor, etc.), a depth sensor, an ultrasound sensor, combinations thereof, or the like. The sensor module 112 can collect raw sensor information from these sensors. In one example, the sensor module 112 includes an output and an input. For example, the sensor module 112 can include a structured light emitter and an optical sensor used to collect information about the external surface based on structured light. Structured light is the process of projecting a known pattern of pixels (e.g., grids, horizontal bars, vertical bars, etc.) on the external surface. This information can be used to determine depth and/or surface information. In certain examples, the structured light is invisible or imperceptible structured light that provides utility without interfering with computer vision. Examples of such structured light include the use of infrared light or high frame rates alternating between two or more patterns (e.g., two exact opposite patterns). In certain examples, the sensor module 112 can be attached to as a peripheral device including the projection module 110. In other examples, the sensor module 112 and the projection module 110 can be separate devices that can be calibrated to work together.

The sensor information can be used by a projection correction module 114 to correct the projection onto the external surface. As such, the projection correction module 114 can stabilize the projected image information on the external surface based on the sensor information. Keystone correction, lens shifting, or other technologies can be used to correct the projection. In one example, structured light is emitted by the sensor module 112 and/or the projection module 110. The structured light is captured by a sensor (e.g., an image sensor) of the sensor module 112. The sensor information can then be processed to determine any differences between flush projections or a previous projection of the structured light compared to the sensor information about the structured light can be used for the correction. For example, the projection module 110 can be caused to augment a display (e.g., a liquid crystal display (LCD), an LED, etc.) used for the projection to account for keystone effects and/or other movement of the mobile device 100.

Further, an egomotion detection module 116 can detect egomotion data from the sensor information. In certain embodiments, egomotion is the three dimensional motion of the mobile device 100 or a portion of the mobile device 100 within an environment. From a set starting point, computer vision can be used to estimate the mobile device's motion relative to a rigid scene (e.g., a wall). Various technologies can be used to implement the detection of the egomotion data. For example, in the case of a camera being used for projection correction, the egomotion data can include changes in the location of the mobile device 100 based on changes detected in the projected image, the external surface, or a combination thereof. Moreover, other sensor types (e.g., depth sensors based on time of flight, sensors based on imagers and/or structured light projection, etc.) can deliver information specific to the sensor type to determine the egomotion data. The egomotion data can cover six degrees of freedom (6 DoF) determined from one or more of the sensors. 6 DoF refers to the position and orientation of the mobile device 100 in three dimensional spaces. Motions in 6 DoF can include the translational movement of the mobile device 100 (e.g., forward/backward, up/down, left/right) as well as the rotational movement (e.g., pitch, yaw, roll) of the mobile device 100.

A motion determination module 118 can determine whether the egomotion data is associated with a motion pattern or multiple motion patterns. As noted, the egomotion data can be used to determine the movement of the mobile device 100. The motion determination module 118 can compare this movement to one or more motion patterns. In certain examples, the egomotion data can be buffered and stored at the mobile device 100. This egomotion data can be processed. The processed or unprocessed egomotion data is then compared to the motion patterns. The motion patterns can include variations and/or buffer room. As such, in certain examples, multiple movements of in the egomotion data can fit a single motion pattern. Further, the egomotion data can be processed to determine whether a sufficient amount of movement has occurred to consider the movement intentional. This can be implemented by setting a threshold movement level that, when hit, triggers a comparison between the egomotion data and the motion patterns. Motion patterns can be predetermined or be customizable. For example, a user may create customized motion patterns.

When a motion pattern is determined to be associated with the egomotion data, a control module 120 can perform a command. Commands can be customizable and/or predetermined. For example, when projecting a screen that has a scrollable environment (e.g., a webpage, an office document, etc.), a rotational movement up, down, left, or right can be associated with a scroll in that direction. In this manner, a user can quickly and easily control the projection during a presentation.

A processor 130, such as a central processing unit (CPU) or a microprocessor suitable for retrieval and execution of instructions and/or electronic circuits can be configured to perform the functionality of any of the modules 110-120 described herein. In certain scenarios, instructions and/or other information, such as egomotion data, motion patterns, etc. can be included in memory 132 or other memory. Input/output interfaces 134 may additionally be provided by the mobile device 100b. For example, input devices 140, such as a keyboard, sensor, a touch interface, a mouse, a microphone, etc. can be utilized to receive input from an environment surrounding the mobile device 100b. Further, an output device 142, such as a display, the projector, speakers, etc. can be utilized to present information to users. Examples of output devices include speakers, display devices, amplifiers, etc. Moreover, in certain embodiments, some components can be utilized to implement functionality of other components described herein.

Each of the modules 110-120 may include, for example, hardware devices including electronic circuitry for implementing the functionality described herein. In addition or as an alternative, each module 110-120 may be implemented as a series of instructions encoded on a machine-readable storage medium of mobile device 100 and executable by processor 130. Further, modules may include components that can be controlled via electronic circuitry, for example, projection units, sensors, motors, etc. It should be noted that, in some embodiments, some modules are implemented as hardware devices, while other modules are implemented as executable instructions.

In one example, the projection module 110 includes a structured light emitter on a first face of the mobile device 100. In the example of a mobile phone or tablet, the structured light emitter can be on an opposite face of a display of the mobile phone or tablet. As such, the user can view the projection information on the mobile phone while also projecting to an external surface. The sensor module 112 can include a camera sensor or other image sensor on the first face. In this manner, the sensor module 112 can be used to detect information about the projection. The structured light emitter can be used to provide location information of the mobile device 100. As such, the egomotion data can be determined, at least in part, by a correlation of information projected by the structured light emitter and the sensor information. For example, a grid pattern can be projected by the structured light emitter. When the sensor information is processed to determine the egomotion data, the known grid pattern can be compared to the egomotion data to determine movements of the mobile device 100 from a previous location. This can be implemented, for example, by comparing the current frame or set of frames of information received at the camera to a previous frame or set of frames. Further, autofocus information of the camera can be used to determine how close or far the mobile device 100 is from the external surface. In certain examples, the structured light is not corrected by the projection correction module 114 to facilitate the determination of egomotion data.

It can be advantageous to have the display in parallel with the projection because the user can see the image projected on both the display and at the projection. Further, in certain scenarios, the user may be able to use touch-enabled input at the display. However, challenges occur in keeping the projected image stable. As such, the projection correction module 114 can correct projected images. Because the projection correction module 114 is being used to correct projected images based on sensor information, other uses can be made for the sensor information without incurring additional cost to build the mobile device 100. For example, egomotion detection can occur without incurring substantial manufacturing costs. Further, motion determination and gesture recognition can be used to determine commands to be implemented by the mobile device 100.

Figure 2:
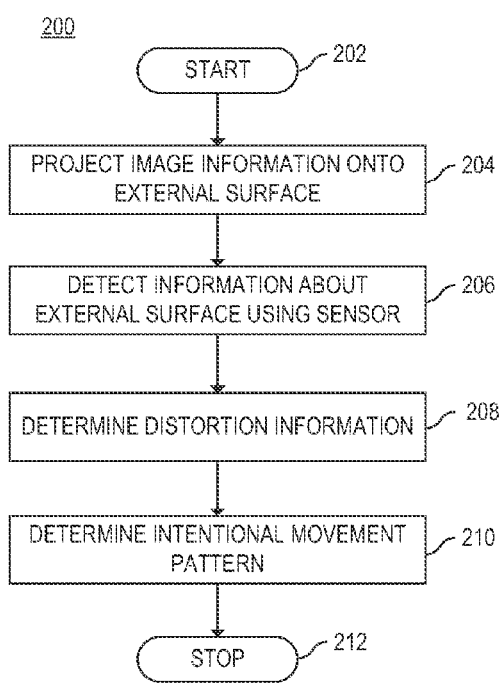
FIG. 2 is a flowchart of a method for determining an intentional movement pattern, according to one example.

FIG. 2 is a flowchart of a method for determining an intentional movement pattern, according to one example. Although execution of method 200 is described below with reference to mobile device 100*b*, other suitable components for execution of method 200 can be utilized (e.g., mobile device 100*a*, computing device 500, etc.). Additionally, the components for executing the method 200 may be spread among multiple devices. Method 200 may be implemented in the form of executable instructions stored on a machine-readable storage medium, and/or in the form of electronic circuitry.

Method 200 may start at 202 and proceed to 204, where mobile device 100*b* may project image information onto an external surface using a projection module 110. The projection can be corrected using a projection correction module 114. For example, LCD or Digital Light Processing (DLP) technologies may use digital conversion and/or scaling for projection correction, such as Keystone correction and/or lens shift correction.

At 206, the sensor module 112 can detect information about the external surface using a sensor on the mobile device 100*b*. Various technologies and/or sensors can be used to detect the information about the external surface. For example, a camera or other image sensor and/or depth sensor facing the external surface can be used to detect the information. The projection module 110 can generate temporally short patterns that can be detected and processed by the sensors and/or projection correction module 114 to estimate topology of the external surface. As such, the detected information about the external surface can include image information about the image projected on the external surface. Additionally or alternatively, a back facing sensor combined with a dedicated structured light emitter can be used to estimate topology of the external surface or a depth sensor (e.g., a time-of-flight based depth camera) can be used to provide a depth map of the external surface. Combinations of technologies can also be used to detect the information about the external surface.

Moreover, at 208, the egomotion detection module 116 can determine distortion information based on the detected information. In certain embodiments, distortion information is information about the external surface that can be correlated to an alteration of a known emission. For example, a known structured light or other projection pattern can be emitted by the mobile device 100*b* and the sensor information can be compared to the structured light and/or pattern to determine distortions. The distortion information can be used to correct the projection and/or to extract egomotion data about the mobile device 100*b*. An egomotion detection approach, for example, a process using a location motion detection scheme based on edge-histogram matching, can be used to extract the egomotion data. As such, 6 DoF information can be extracted from the distortion information.

Then, at 210, the motion determination module 118 determines that an intentional movement pattern is associated with the distortion information. In certain examples, a portion of the distortion information is determined. The portion can be a time sample of the distortion information. A cache can store portion of information. As noted above, the distortion information can include image information or other information about the projected image and/or the external surface. This information can be compared to a set of reference patterns. The set of reference patterns can include exact patterns and/or patterns that are associated with ranges that represent one or more intentional movements. The motion determination module 118 can determine whether the image information and/or other distortion information are associated with an intentional movement based on the comparison. In one example, the comparison yields a positive result. The pattern can be associated with a command or process (e.g., via a table or other data structure). When an intentional movement is determined, a command or action associated with the intentional movement is performed. At 212, the method 200 stops. The mobile device 100 can continue other processes including projection, projection correction, performing commands, presentation processes, combinations thereof, etc.

During the process 200, the sensor module 112, the egomotion data, and/or other results can be used by the projection correction module 114 to project a viewable image on the external surface. Further, the correction can include vertical and/or horizontal keystone correction, lens shifting, and other stabilization mechanisms. As such, the projection correction module 114 can stabilize the projection so that the projected image appears to stick to an area of the external surface from the perspective of a user. The projection correction module 114 can thus correct overall shift (e.g., in the X and Y directions) of the projection due to motion of the projector. Moreover, the projection correction module 114 can correct the overall projection size due to distance changes. This can be corrected, for example, by changing the portion used of an LCD or other unit used as a base for the projection.

Sensing of intentional movements using this process is advantageous over other methods, such as inertial sensing or optical flow measurements, because there is no sensor drift. Further, training need not be necessary as in other methods, such as parallel tracking and mapping approaches. Moreover, costs can be reduced in the overall production of the mobile device 100 because no additional sensors are required beyond those required for imaging or other sensors that are used for the projection correction. As such, this approach can be incorporated into mobile projection devices with correction capabilities using software that can be executed by a processor.

Figure 3:
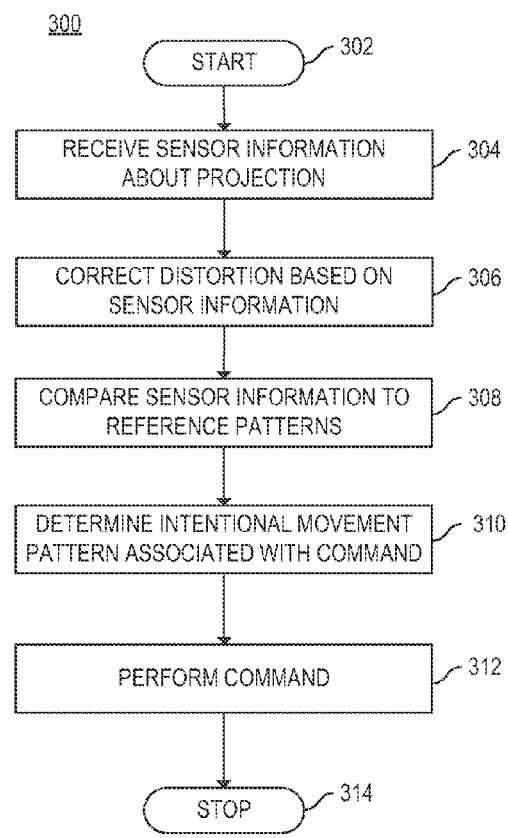
FIG. 3 is a flowchart of a method for performing a command based on an intentional movement pattern, according to one example.

FIG. 3 is a flowchart of a method for performing a command based on an intentional movement pattern, according to one example. Although execution of method 300 is described below with reference to mobile device 100b, other suitable components for execution of method 300 can be utilized (e.g., mobile device 100a, computing device 500, etc.). Additionally, the components for executing the method 200 may be spread among multiple devices. Method 300 may be implemented in the form of executable instructions stored on a machine-readable storage medium, and/or in the form of electronic circuitry. The mobile device 100b can be put into a mode where the mobile device 100b projects a presentation onto an external surface.

Method 300 may start 302 and proceed to 304, where mobile device 100b receives sensor information about a projection and/or the external surface on which the presentation is projected. In certain examples, the sensor can receive image information about the projection (e.g., image information about temporarily short patterns projected, image information about a structured light emitter, etc.), the depth of the external surface, combinations thereof, etc. As with method 200, this information can be processed to determine distortion information, egomotion information, etc.

At 306, a distortion in the projection on the external surface can be corrected based on the sensor information (e.g., processed sensor information, distortion information, egomotion information, etc.). For example, the distortion can be corrected based on keystone technology, lens shifting, etc. The sensor information can also be used for determining an intentional movement pattern.

As such, at 308, the motion determination module 118 compares the sensor information to a reference pattern or multiple reference patterns. The sensor information can be processed or unprocessed. For example, sensor information can include raw image information or processed sensor information such as distortion information, egomotion information, etc. In one example, the sensor information can be processed to detect 6 DoF motion of the mobile device 100b. The reference patterns can similarly be of one or more motions of the mobile device. The comparison is then used to determine whether an intentional movement pattern is associated with a motion determined from the sensor information. In one embodiment, if the motion of the mobile device 100b matches or is within the movement covered by a reference pattern, an intentional movement is determined to occur. In one example, no intentional movement is determined to have occurred. In this scenario, the motion determination module 118 can continue to monitor incoming sensor information for an intentional movement.

In another example, the sensor information leads to the determination that an intentional movement of the mobile device has occurred. Each of the reference patterns can be associated with a command. A data structure can store relationships between reference patterns and commands. At 310, a control module 120 determines that the intentional movement pattern is associated with one of the commands. A pattern can be associated with a gesture that a user can perform, which can be associated with a command. As such, the command can be associated with the gesture. For example, a rotational turn or tilt of the mobile device 100b can reflect a command to scroll a presentation in the direction of the tilt.

At 312, the control module 120 performs the command. In certain examples, the control module 120 can be associated with a program or application that is presented via the projection module 110. Other examples of movement patterns include gestures such as moving the mobile device 100b to a particular direction for over threshold acceleration, a rotational movement, a rotational movement in conjunction with acceleration to a direction, combinations thereof, etc. Further, the force and/or speed used to perform the movement can be used to determine the movement pattern. Example commands include scrolling up/down or left/right in a presentation, going back or forward a page or slide in a browser or presentation, zooming in or out, increasing or decreasing font size, refreshing a screen, and other navigational or shortcut commands. At 314 the method 300 stops. Other functionality of the mobile device 100b can continue to be performed.

Figure 4:
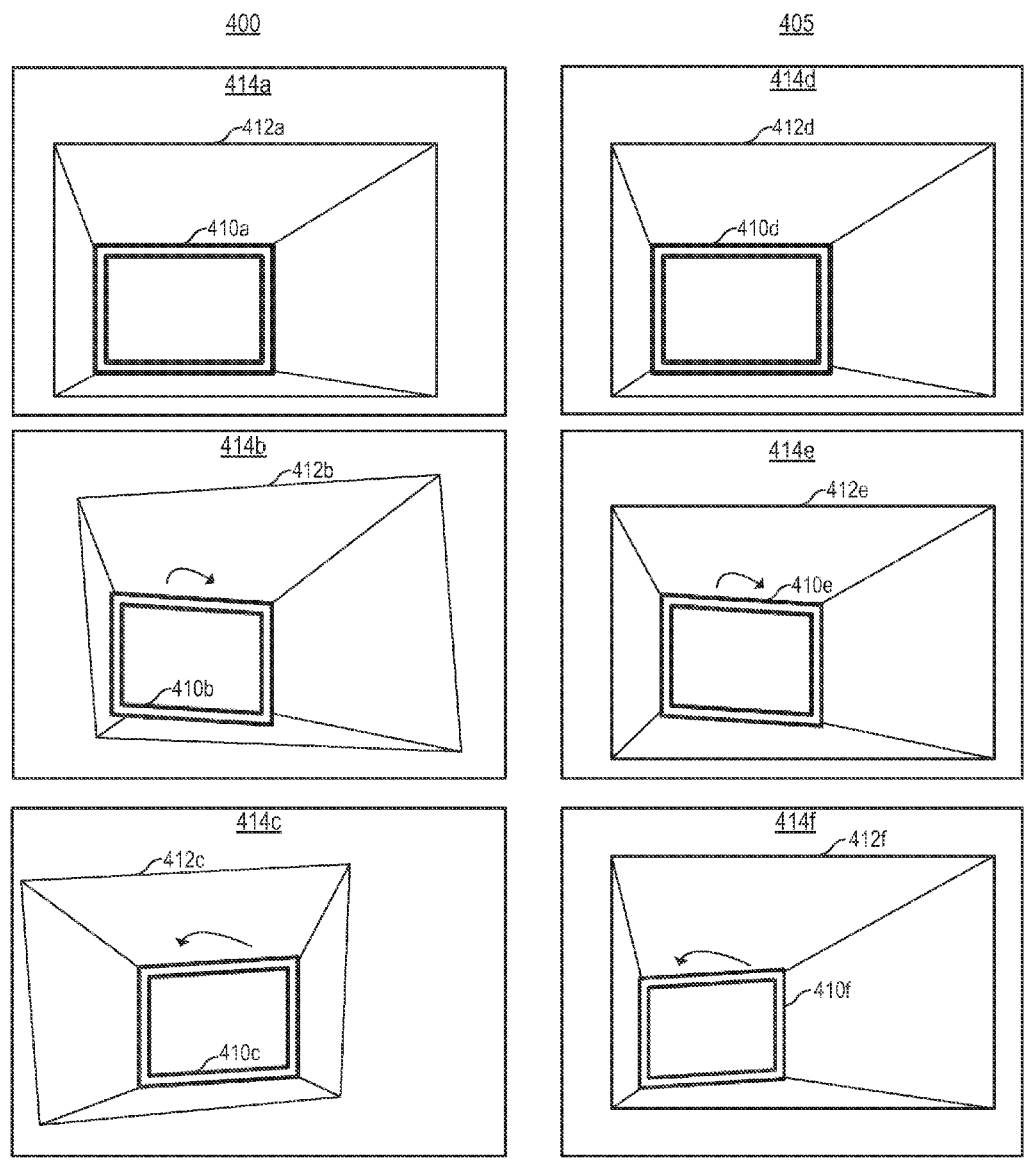
FIG. 4 is a diagram of an example gesture detection while correcting projected image information, according to one example.

FIG. 4 is a diagram of example gesture detection while correcting projected image information, according to one example. FIG. 4 includes two sets 400, 405 of diagrams of mobile devices 410a-410f and corresponding projections 412a-412f on respective surfaces 414a-414f. The surfaces 414a-414f are external to the mobile devices 410a-410f.

Mobile devices 410a-410c include projection units that do not include dynamic projection correction. As such, a stationary projection 412a via the mobile device 410a on surface 414a looks focused to a user. However, when the user turns the mobile device 410b to the right, the projection 412b becomes distorted on the external surface 414b. Further, when the user turns mobile device 410c to the left, the projection 412c becomes distorted and shows as a trapezoid on the surface 414c.

The projections on the set 405 on the right correct for these distortions. As noted above, these corrections can be done using a sensor pointed at the respective external surfaces 414d, 414e, 414f. These sensors can be supplemented by other devices or sensors, for example gyroscopes, accelerometers, etc. Further, as such, when the mobile device 410e is turned towards the right, the projection 412e on surface 414e remains steady. Similarly, as mobile device 410f is turned towards the left, the projection 412f on surface 414f remains steady. The projector can be actuated (e.g., using a motorized pan-tilt mechanism that physically counteracts in real time the mobile device's rotational and/or translational movement), employ a wide angle projection where only part of the projection angle is in use at a particular time (resulting in virtual panning of the projection), or the like. In certain examples, maximum ranges of motion changes can be associated with correctable movement. For example, a 180 degree turn of the mobile device 410f would not be able to project on the surface 414f. Corrections can be made for unintentional shaking and/or unintentional user motions as well as for intentional motions.

As noted above, the information from the sensors can be used to determine egomotion of a mobile device. As such, the movement of mobile device 410e can be monitored and determined to be an intentional rotational movement to the right. Similarly, the movement of mobile device 410f can be an intentional rotational movement to the left. Once an intentional movement is determined to be associated with a mobile device 410d-410f, the movement can be associated with a command. The command can then be performed. For example the rotational movement to the left of mobile device 410f can be associated with a command to move a presentation back a slide of a presentation, push the back button of a webpage, or scroll to the left. Various customizations of motion patterns and commands can be used.

Figure 5:
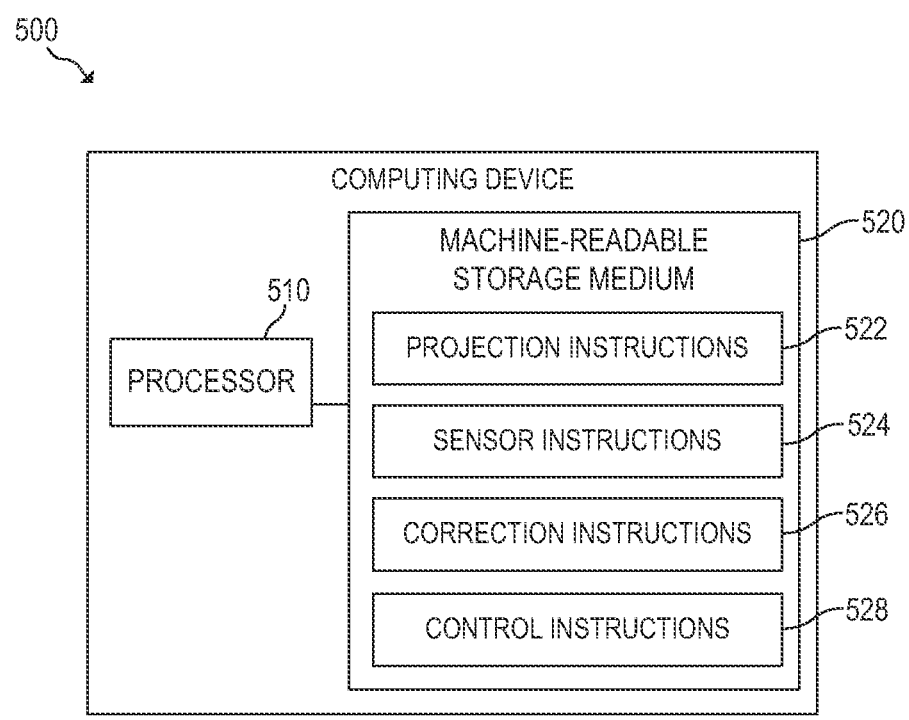
FIG. 5 is a block diagram of a computing device capable of determining an intentional movement of the computing device based on sensor information describing an image projected by the computing device, according to one example.

FIG. 5 is a block diagram of a computing device capable of determining an intentional movement of the computing device based on sensor information describing an image projected by the computing device, according to one example. The computing device 500 includes, for example, a processor 510, and a machine-readable storage medium 520 including instructions 522, 524, 526, 528 for determining intentional movements of the computing device 500 based on sensor information about a projection, an external surface, or a combination thereof. Computing device 500 may be, for example, a notebook computer, a slate computing device, a tablet device, a portable reading device, a wireless email device, a mobile phone, a digital pen projection device, or any other computing device that is portable and includes projection capabilities.

Processor 510 may be, at least one central processing unit (CPU), at least one semiconductor-based microprocessor, at least one graphics processing unit (GPU), other hardware devices suitable for retrieval and execution of instructions stored in machine-readable storage medium 520, or combinations thereof. For example, the processor 510 may include multiple cores on a chip, include multiple cores across multiple chips, or combinations thereof. Processor 510 may fetch, decode, and execute instructions 522, 524, 526, 528 to implement methods 200, 300. As an alternative or in addition to retrieving and executing instructions, processor 510 may include at least one integrated circuit (IC), other control logic, other electronic circuits, or combinations thereof that include a number of electronic components for performing the functionality of instructions 522-528.

Machine-readable storage medium 520 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium can be non-transitory. As described in detail herein, machine-readable storage medium 520 may be encoded with a series of executable instructions for performing various processes.

In one example, projection instructions 522 can be executed by the processor 510 to cause a projector associated with the computing device 500 to project projection image information onto an external surface. In certain examples, projection image information includes information about a presentation. Further, the projection image information can include multiple images that can be projected in sequence. Additionally, in certain examples, the projection image information can include cues that when detected by a sensor of the computing device 500, can be used to correct the projection and/or determine egomotion associated with the computing device 500. In certain scenarios, the cues can be from a structured light emitter or temporally short patterns that can be recognized by the sensor.

Sensor instructions 524 can be executed by the processor 510 to control reception of sensor information from one or more sensors. As noted, the sensor information can describe the projected image information, the external surface, or a combination thereof. The processor 510 can execute correction instructions 526 to control the projector mechanically or virtually to correct the projected image on the external surface based on the sensor. The correction of the projection can be for drift correction, correction of vibration or shaking, keystone effects, or a combination thereof. In certain examples, drift can be considered a slow and steady movement of the computing device 500.

Further, the sensor information can be processed by the processor 510 to determine spatial data of the mobile device, a sensor on the mobile device, the projector, etc. The spatial data can include 6 DoF information determined from the sensors. The spatial data may additionally be supplemented by other sensors or processing. Control instructions 528 may be executed by the processor 510 to determine an intentional motion from the spatial data. In certain examples, the spatial data may be determined to include intentional and/or unintentional motions. The projection instructions 522 and correction instructions 526 can be used to correct intentional and unintentional motions of the computing device 500. Further, the processor 510 can compare the spatial data to a reference pattern or multiple reference patterns to determine whether a motion associated with the spatial data is intentional and whether the motion is associated with a particular pattern. Moreover, particular patterns can be associated with one or more commands. The control instructions 528 can associate a particular movement with a command and can perform the command.

What is claimed is:

1. A method for stabilizing one or more images, the method comprising:
   projecting an image onto an external surface from a mobile device;
   detecting optical information about the projected image and the external surface using an optical sensor on the mobile device;
   determining motion of the mobile device relative to the external surface based on the detected optical information; and
   adjusting the projected image on the external surface based on the determined motion.

2. The method of claim 1, wherein the external surface is a rigid surface.

3. The method of claim 1, wherein projecting the image onto the external surface comprises projecting structured light onto the external surface.

4. The method of claim 3, wherein the structured light comprises infrared light.

5. The method of claim 1, wherein
   determining the motion is based on detecting a change in a projection angle for the projected image, and
   adjusting the projected image comprises adjusting the projection angle based on the change in the projection angle for the projected image.

6. The method of claim 1, wherein
   determining the motion is based on detecting a change in a distance between the external surface and the mobile device, and
   adjusting the projected image comprises adjusting the size of the projected image on the external surface based on the detected change in the distance between the external surface and the mobile device.

7. The method of claim 1, wherein
determining the motion is based on detecting a shift in the projected image on the external surface, and
adjusting the projected image comprises adjusting the projection of the image based on the shift in the projected image.

8. The method of claim 1, wherein:
the optical sensor includes an image sensor; and
detecting the optical information includes capturing, using the image sensor, the image projected on the external surface.

9. An apparatus for stabilizing one or more images, the apparatus comprising:
a projector configured to project an image onto an external surface;
an optical sensor configured to detect optical information about the projected image and the external surface; and
a processor coupled to the optical sensor and the projector and configured to:
determine motion of the apparatus relative to the external surface based on the detected optical information; and
adjust the projected image on the external surface based on the determined motion.

10. The apparatus of claim 9, wherein the external surface is a rigid surface.

11. The apparatus of claim 9, wherein projecting the image onto the external surface comprises projecting structured light onto the external surface.

12. The apparatus of claim 11, wherein the structured light comprises infrared light.

13. The apparatus of claim 9, wherein the processor is configured to:
determine the motion by detecting a change in a projection angle for the projected image; and
adjust the projected image by adjusting the projection angle based on the change in the projection angle for the projected image.

14. The apparatus of claim 9, wherein the processor is configured to:
determine the motion by detecting a change in a distance between the external surface and the apparatus; and
adjust the projected image by adjusting the size of the projected image on the external surface based on the detected change in the distance between the external surface and the apparatus.

15. The apparatus of claim 9, wherein the processor is configured to:
determine motion by detecting a shift in the projected image on the external surface; and
adjust the projection of the image based on the shift in the projected image.

16. The apparatus of claim 9, wherein the apparatus is a wireless communication device.

17. The apparatus of claim 16, wherein the wireless communication device is a cellular telephone.

18. An apparatus for stabilizing one or more images, the apparatus comprising:
means for projecting an image onto an external surface;
means for detecting optical information about the projected image and the external surface using an optical sensor coupled to the apparatus;
means for determining motion of the apparatus relative to the external surface based on the detected optical information; and
means for adjusting the projected image on the external surface based on the determined motion.

19. The apparatus of claim 18, wherein the external surface is a rigid surface.

20. The apparatus of claim 18, wherein projecting the image onto the external surface comprises projecting structured light onto the external surface.

21. The apparatus of claim 18, wherein
means for determining the motion is based on means for detecting a change in a projection angle for the projected image; and
means for adjusting the projected image comprises means for adjusting the projection angle based on the change in the projection angle for the projected image.

22. The apparatus of claim 18, wherein
means for determining the motion is based on means for detecting a change in a distance between the external surface and the apparatus; and
means for adjusting the projected image comprises means for adjusting the size of the projected image on the external surface based on the detected change in the distance between the external surface and the apparatus.

23. The apparatus of claim 18, wherein
means for determining the motion is based on means for detecting a shift in the projected image on the external surface; and
means for adjusting the projected image comprises means for adjusting the projection of the image based on the shift in the projected image.

* * * * *